United States Patent
Pinarbasi

(10) Patent No.: US 6,226,159 B1
(45) Date of Patent: May 1, 2001

(54) MULTILAYERED PINNED LAYER OF COBALT BASED FILMS SEPARATED BY A NICKEL BASE FILM FOR IMPROVED COUPLING FIELD AND GMR FOR SPIN VALVE SENSORS

(75) Inventor: Mustafa Pinarbasi, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/344,102

(22) Filed: Jun. 25, 1999

(51) Int. Cl.$^7$ ............................................. G11B 5/39
(52) U.S. Cl. ......................................... 360/324.11
(58) Field of Search ......................... 360/324.1, 324.12

(56) References Cited

U.S. PATENT DOCUMENTS

| | | | |
|---|---|---|---|
| 5,408,377 | 4/1995 | Gurney et al. | 360/113 |
| 5,462,795 | 10/1995 | Shinjo et al. | 428/332 |
| 5,465,185 | 11/1995 | Heim et al. | 360/113 |
| 5,477,482 | 12/1995 | Prinz | 365/129 |
| 5,598,308 | 1/1997 | Dieny et al. | 360/113 |
| 5,661,062 | 8/1997 | Prinz | 438/3 |
| 5,701,223 | 12/1997 | Fontana, Jr. et al. | 360/113 |
| 5,768,069 | 6/1998 | Mauri | 360/113 |
| 5,828,529 | 10/1998 | Gill | 360/113 |
| 6,127,053 | * 10/2000 | Lin | 360/324.11 |

FOREIGN PATENT DOCUMENTS

| | | | |
|---|---|---|---|
| 6295420 | 10/1994 | (JP) | G11B/5/39 |
| 408273124 | 10/1996 | (JP) | G11B/5/39 |
| 409054916 | 2/1997 | (JP) | G11B/5/39 |

OTHER PUBLICATIONS

L. J. Heyderman et al, "Electron microscope observations of the magnetic structures in magnetoresistive multilayer films", *Journal of Physics D Applied Physics*, vol. 27, No. 5, May 14, 1994, pp. 881–891.

L. J. Heyderman et al, "TEM investigation of the magnetisation processes in exchange coupled multilayer films", *Journal of Magnetism and Magnetic Materials* 138 (1994), pp. 344–354.

C. Cowache et al, "Magnetic and transport properties of NiFe/Ag and Co/NiFe/Co/Ag multilayers", *Physical Review B*, vol. 53, No. 22, Jun. 1, 1996, pp. 15027–15035.

* cited by examiner

Primary Examiner—A. J. Heinz
(74) Attorney, Agent, or Firm—Gray Cary Ware & Freidenrich; Ervin F. Johnston

(57) ABSTRACT

A multifilm structure is provided for a pinned layer structure of a spin valve sensor for increasing the magnetoresistive coefficient (dr/R) of the sensor and/or decreasing a ferromagnetic coupling field ($H_F$) between the pinned layer structure and the free layer of the sensor. The multifilm structure for the pinned layer in one or both AP layers of an AP pinned layer structure or a single pinned layer structure includes a nickel iron (NiFe) middle layer which is located between a cobalt (Co) first film and a cobalt (Co) second film.

27 Claims, 10 Drawing Sheets

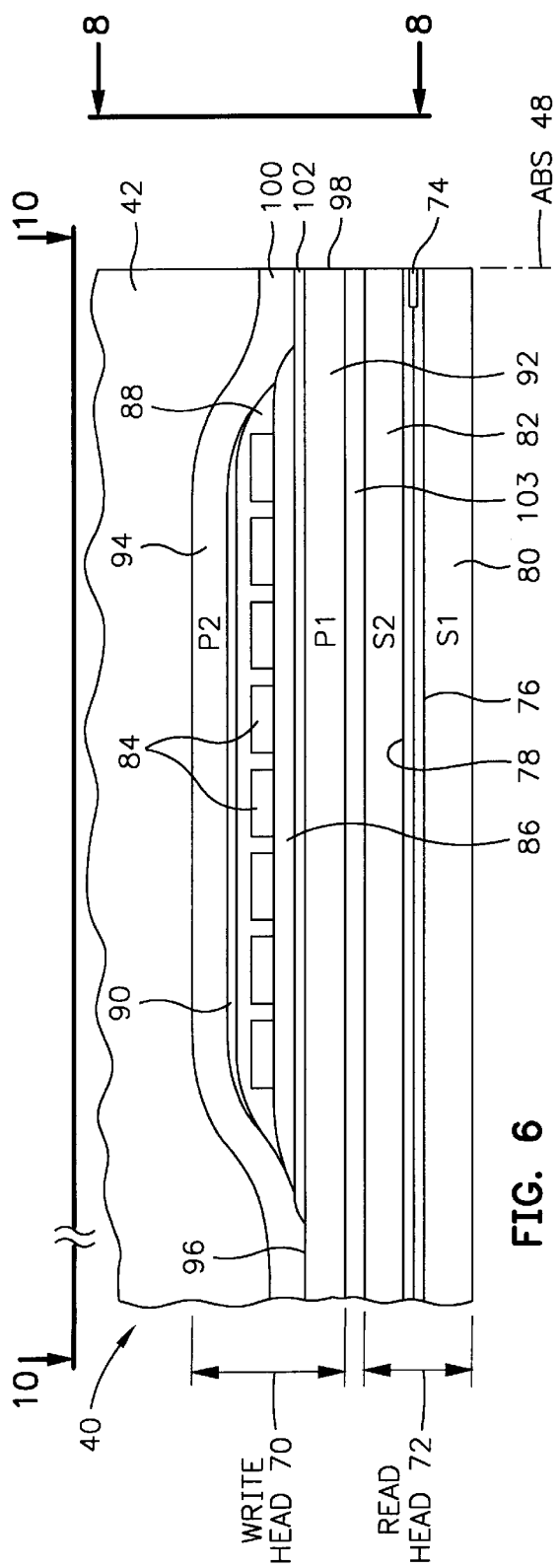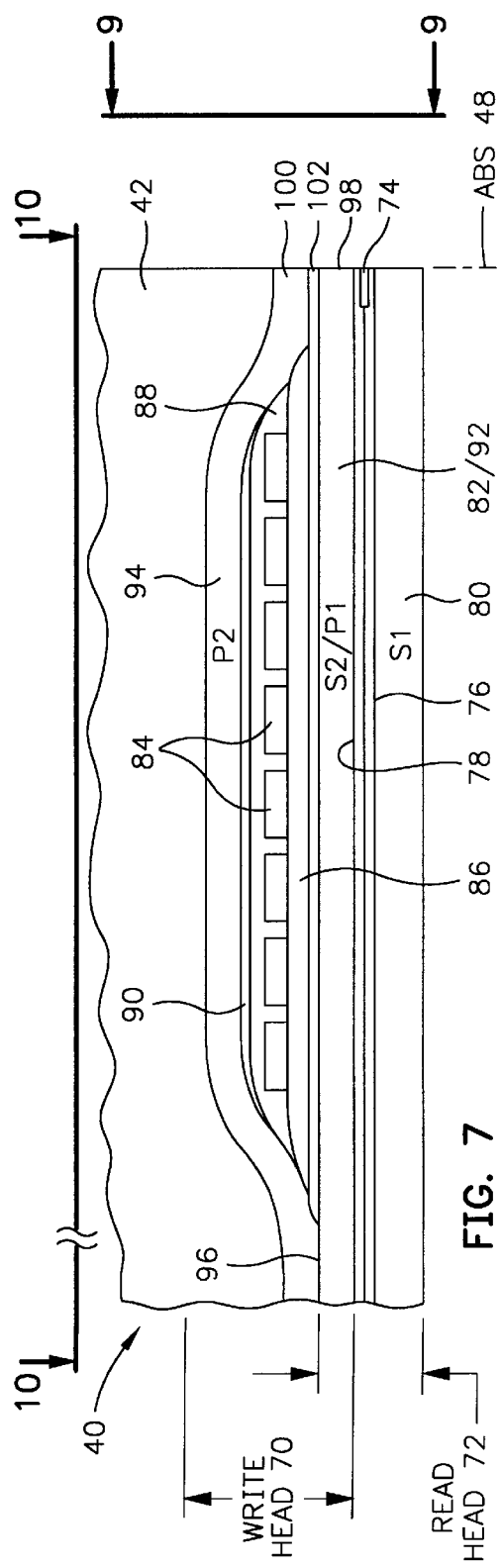

(ABS)

MULTILAYERED PINNED LAYER OF COBALT BASED FILMS SEPARATED BY A NICKEL BASE FILM FOR IMPROVED COUPLING FIELD AND GMR FOR SPIN VALVE SENSORS

BACKGROUND OF THE INVENTION

1. Field of the Invention

The present invention relates to a multilayered pinned layer structure for improved coupling field and giant magnetoresistance (GMR) for spin valve sensors and more particularly to a nickel iron (NiFe) based film between first and second cobalt (Co) based films pinned layer structure in one or both antiparallel (AP) pinned layers of an AP pinned layer structure or in a single pinned layer structure for improved coupling field and/or GMR of a spin valve sensor.

2. Description of the Related Art

A spin valve sensor is employed by a read head for sensing magnetic fields on a moving magnetic medium, such as a rotating magnetic disk or a linearly moving magnetic tape. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. The magnetic moment of the free layer is free to rotate in positive and negative directions from a quiescent or bias point position in response to positive and negative magnetic field signals from a rotating magnetic disk. The quiescent position is the position of the magnetic moment of the free layer with the sense current conducted through the sensor in the absence of signal fields. The quiescent position of the magnetic moment of the free layer is typically parallel to the ABS. If the quiescent position of the magnetic moment is not parallel to the ABS in the absence of a signal field the positive and negative responses of the free layer to positive and negative signal fields will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is minimal and when their magnetic moments are antiparallel scattering is maximized. Changes in scattering in response to field signals from a rotating disk changes the resistance of the spin valve sensor as a function of $\cos\theta$, where $\theta$ is the angle between the magnetic moments of the pinned and free layers. The sensitivity of the sensor is quantified as magnetoresistive coefficient dr/R where dr is the change in resistance of the sensor between parallel and antiparallel orientations of the pinned and free layers and R is the resistance of the sensor when the moments are parallel.

The transfer curve (readback signal of the spin valve head versus applied signal from the magnetic disk) of a spin valve sensor is a substantially linear portion of the aforementioned function of $\cos\theta$. The greater this angle, the greater the resistance of the spin valve to the sense current and the greater the readback signal (voltage sensed by processing circuitry). With positive and negative signal fields from a rotating magnetic disk (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the free layer is parallel to the ABS, and the direction of the magnetic moment of the pinned layer is perpendicular to the ABS in a quiescent state (absence of signal fields) the bias point is located at zero and the positive and negative readback signals will be equal when sensing positive and negative signal fields from the magnetic disk. The readback signals are then referred to in the art as having symmetry about the zero bias point. When the readback signals are not equal the readback signals are asymmetric.

The location of the bias point on the transfer curve is influenced by three major forces on the free layer, namely a demagnetization field ($H_{demag}$) from the pinned layer, a ferromagnetic coupling field ($H_F$) between the pinned layer and the free layer, and sense current fields ($H_I$) from all conductive layers of the spin valve except the free layer. When the sense current is conducted through the spin valve sensor, the pinning layer (if conductive), the pinned layer and the first spacer layer, which are all on one side of the free layer, impose sense current fields on the free layer that rotate the magnetic moment of the free layer in a first direction. The ferromagnetic coupling field from the pinned layer further rotates the magnetic moment of the free layer in the first direction. The demagnetization field from the pinned layer on the free layer rotates the magnetic moment of the free layer in an opposite second direction. Accordingly, the demagnetization field is counterbalanced by the sense current and ferromagnetic coupling fields.

Over the years a significant amount of research has been conducted to improve the GMR or magnetoresistive coefficient dr/R of spin valve sensors. These efforts have increased the storage capacity of computers from kilobytes to megabytes to gigabytes. It is known that when the thickness of the spacer layer is decreased the magnetoresistive coefficient of the sensor is increased so as to increase storage capacity. Unfortunately, when the thickness of the spacer layer is decreased the aforementioned ferromagnetic coupling $H_F$ between the pinned and free layer is increased. This affects the aforementioned bias point and requires that the sense current and/or the thickness of the pinned layer be changed to adjust the sense current fields and the demagnetization fields acting on the free layer. There is a strong felt need to increase the magnetoresistive coefficient of the spin valve sensor without increasing the ferromagnetic coupling field.

SUMMARY OF THE INVENTION

The present invention provides a novel multilayered pinned layer structure which reduces a ferromagnetic coupling field between the pinned and free layers. This then enables the thickness of the spacer layer between the pinned and free layers to be reduced so as to increase the magnetoresistive coefficient (dr/R) while maintaining the ferromagnetic coupling field at an original amount. With this arrangement the sense current fields and the demagnetization field acting on the free layer do not have to be adjusted to maintain a zero bias point orientation of the magnetic moment of the free layer during the quiescent condition of the sensor (absence of signal field). The novel multilayered pinned layer structure includes a middle nickel iron (NiFe) based film located between first and second cobalt (Co) based films. The novel multilayered pinned layer structure may be employed for a single pinned layer structure or one or both of antiparallel (AP) pinned layers of an antiparallel pinned layer structure. With this arrangement I have been able to increase the magnetoresistive coefficient (dr/R) from 3.95% to 4.2% by replacing a cobalt (Co) pinned layer with a cobalt, nickel iron and cobalt (Co/NiFe/Co) trilayer with an equivalent magnetic thickness. The magnetoresistive coefficient was increased by reducing the thickness of the spacer layer until the ferromagnetic coupling field was at its original value. By reducing the thickness of the spacer layer, however, the aforementioned improvement in the magnetoresistive coefficient (dr/R) is obtained.

An object of the present invention is to provide a spin valve sensor with an improved magnetoresistive coefficient dr/R and/or magnetic coupling field $H_F$ between the pinned and free layers Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
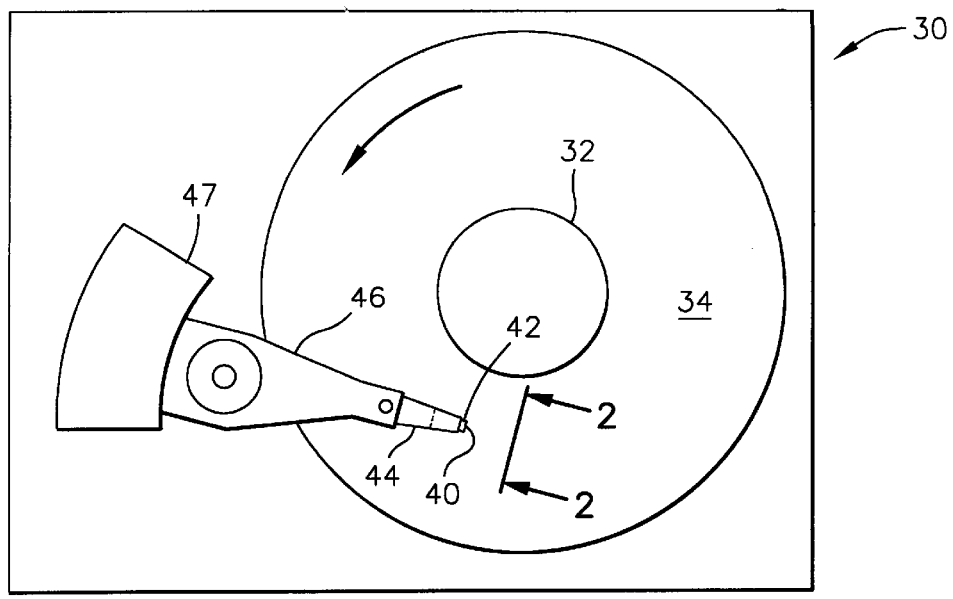
FIG. 1 is a planar view of an exemplary magnetic disk drive.
Figure 2:
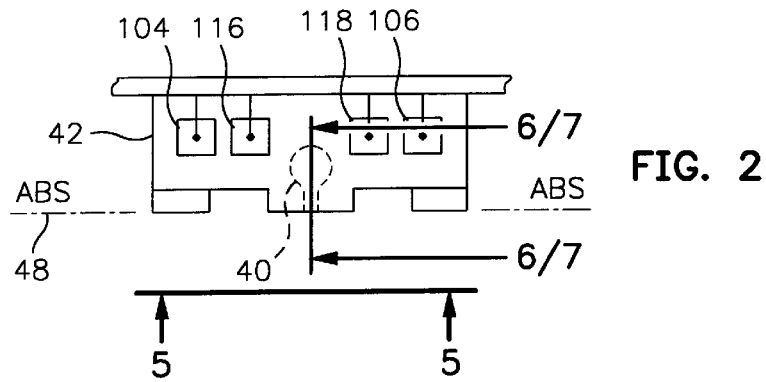
FIG. 2 is an end view of a slider with a magnetic head of the disk drive as seen in plane 2—2.
Figure 3:
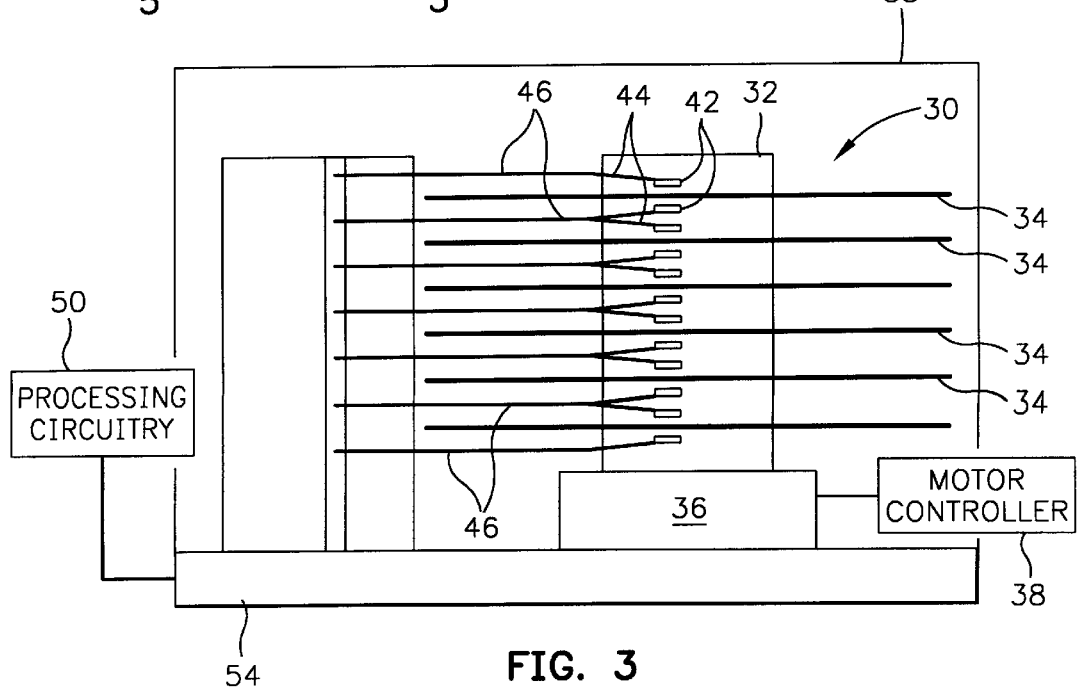
FIG. 3 is an elevation view of the magnetic disk drive wherein multiple disks and magnetic heads are employed.
Figure 4:
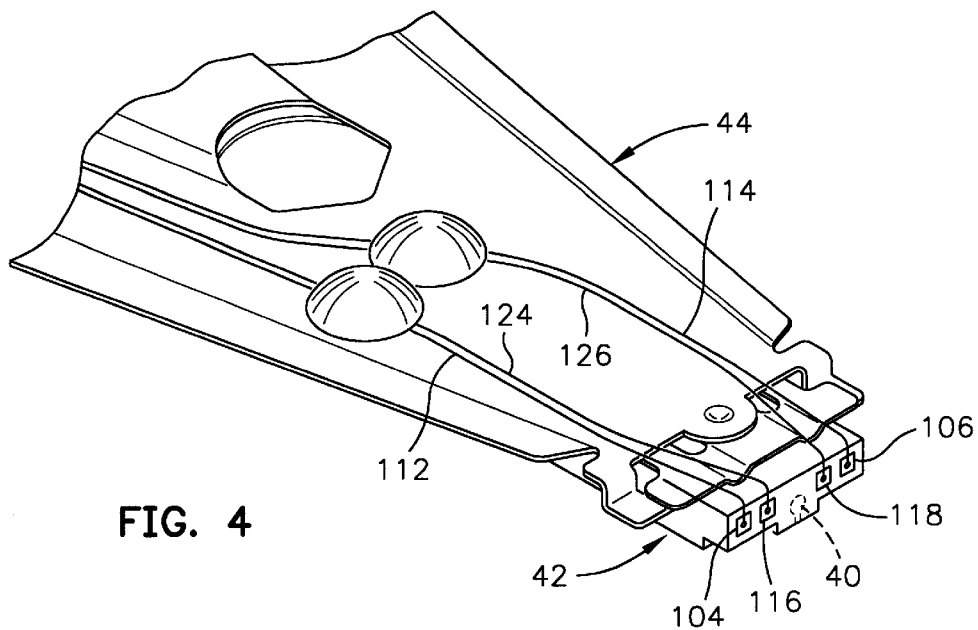
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 which is rotatably positioned by an actuator 47. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals to the actuator 47 for moving the slider to various tracks on the disk. In FIG. 4 the slider 42 is shown mounted to a suspension 44. The components described hereinabove may be mounted on a frame 54 of a housing 55, as shown in FIG. 3.

Figure 5:
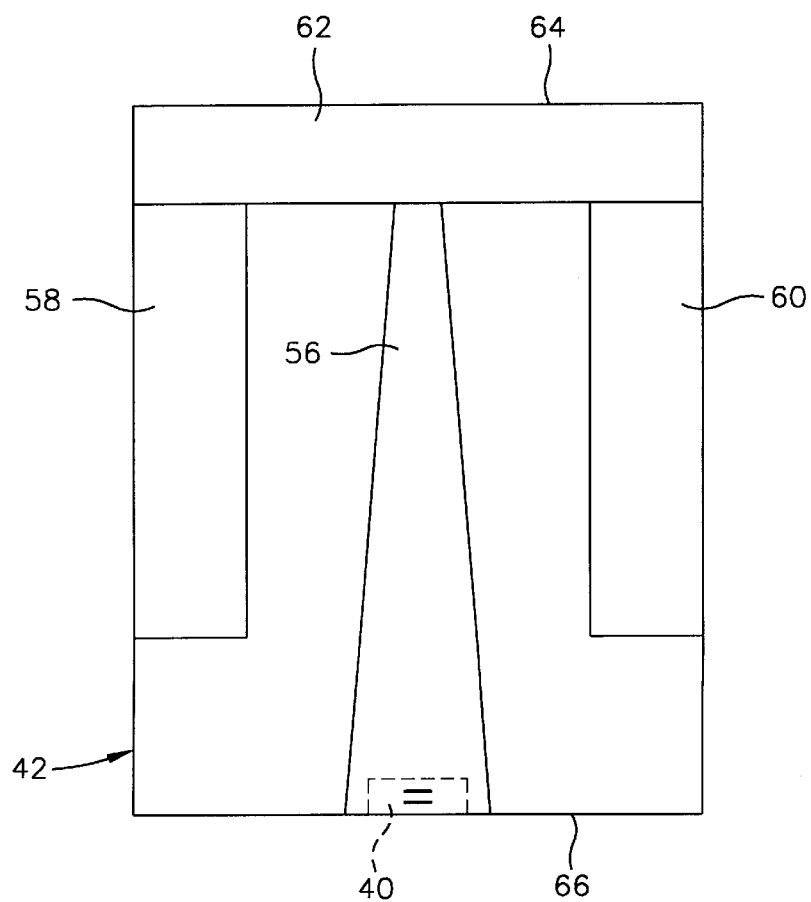
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
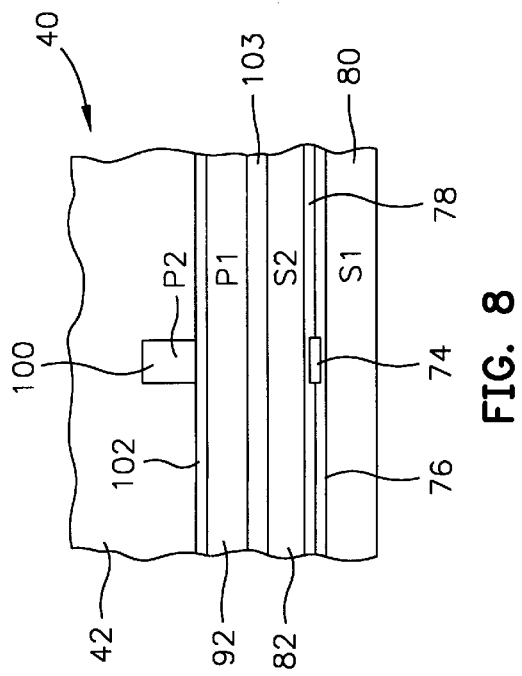
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
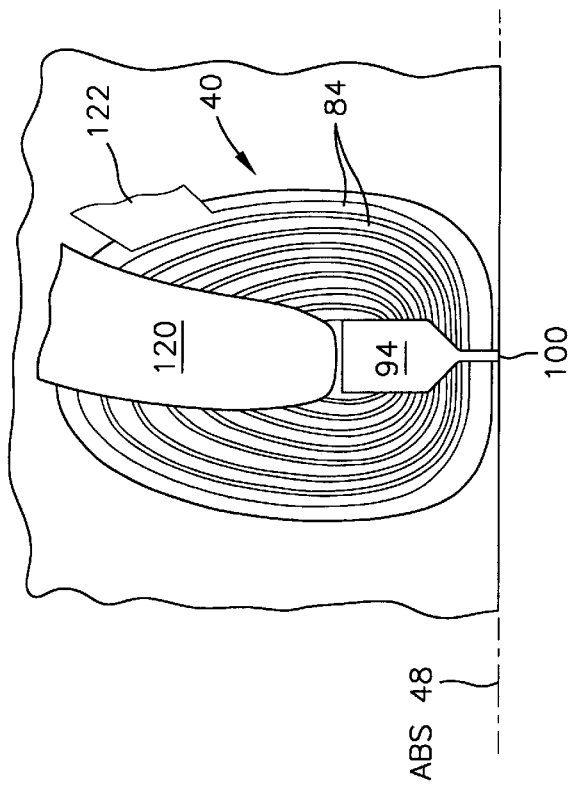
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
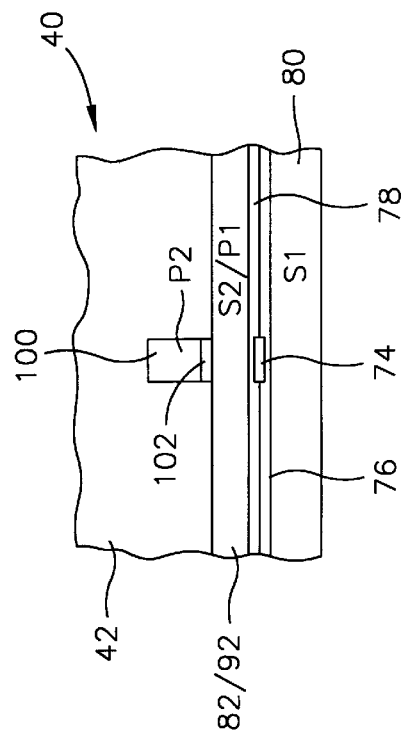
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
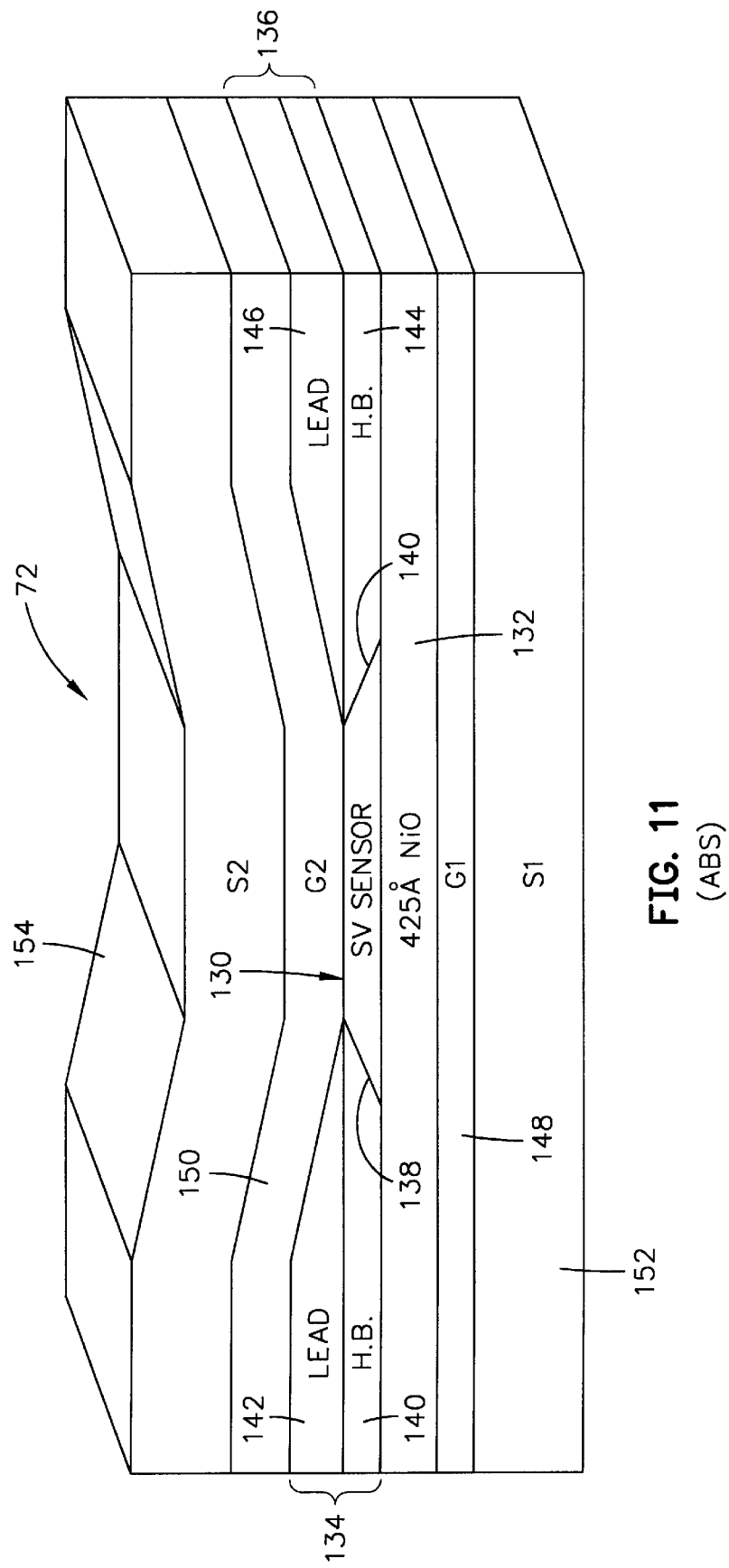
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

EXAMPLE 1

Figure 12:
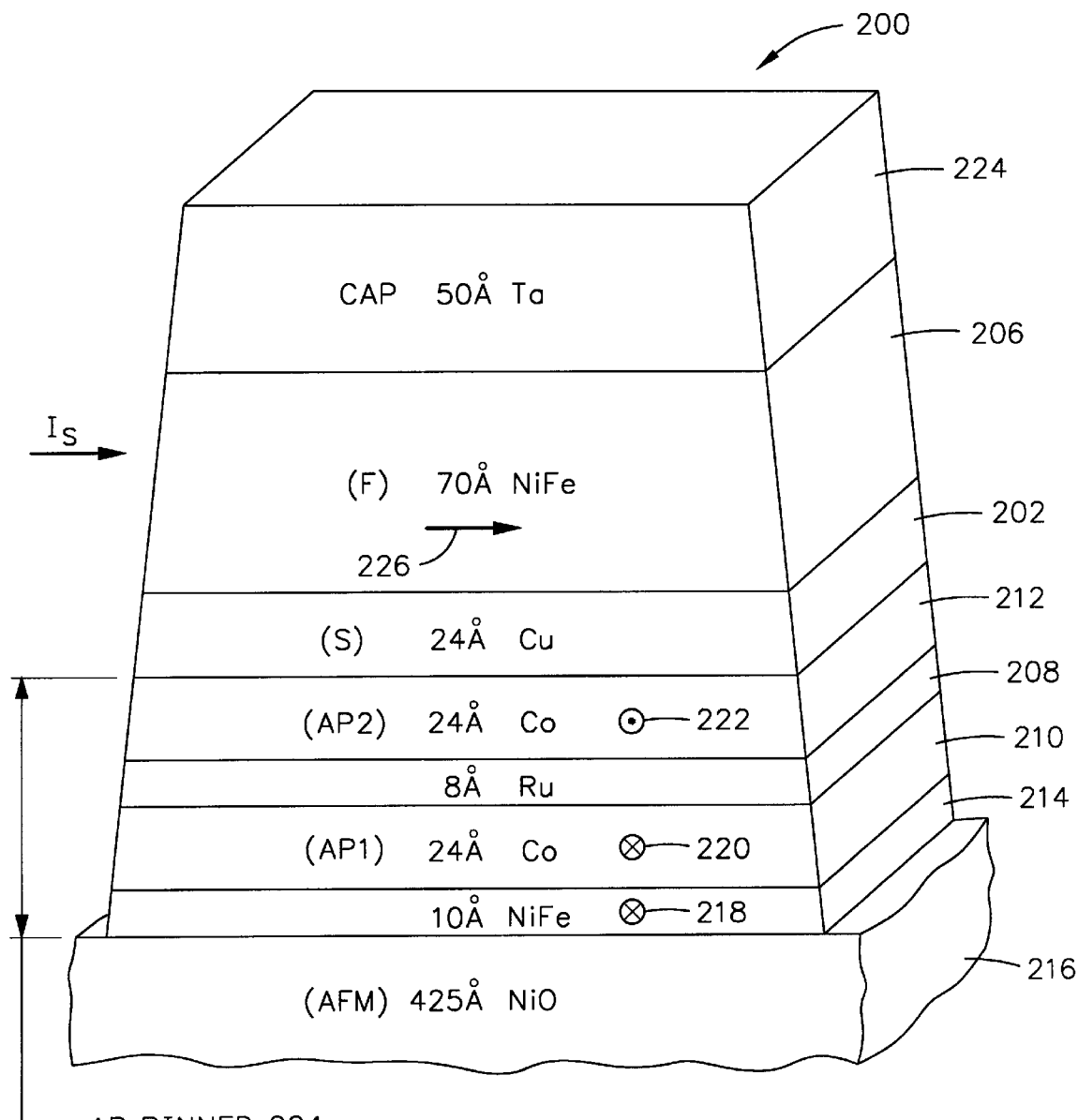
FIG. 12 is an ABS isometric illustration of a first example of an antiparallel (AP) pinned read sensor investigated.

FIG. 12 illustrates a first example of a spin valve sensor 200 investigated by me. The spin valve sensor 200 includes a nonmagnetic conductive spacer layer 202 which is located between an antiparallel (AP) pinned layer structure 204 and a free layer 206. The AP pinned layer structure 204 includes an AP coupling layer 208 which is located between first and second AP pinned layers (AP1) 210 and (AP2) 212. The AP structure 204 further includes a seed layer 214 which is located between an antiferromagnetic pinning layer 216 and the first AP pinned layer 210. A cap layer 224 may be located on the free layer 206 to protect it from subsequent processing steps.

By exchange coupling between the pinning layer 216 and the seed layer 214 the pinning layer 216 pins magnetic moments 218 and 220 of the seed layer and the first AP pinned layer perpendicular to the ABS, either toward the ABS or away from the ABS, as shown in FIG. 12. By antiparallel exchange coupling between the first and second AP pinned layers 210 and 212 a magnetic moment 222 of the second AP pinned layer is pinned antiparallel to the magnetic moments 218 and 220.

An exemplary direction of the sense current Is is from left to right and an exemplary direction of the magnetic moment 226 of the free layer is from left to right, as shown in FIG. 12. The sense current Is causes the conductive layers 214, 210, 208, 212 and 202 to exert sense current fields on the free layer 206 which are toward the ABS. The second AP pinned layer 212 exerts a ferromagnetic coupling field on the free layer which is also toward the ABS because of the thinness of the spacer layer 202. The magnetic moment 222 of the second AP pinned layer also exerts a demagnetization field on the free layer 206 which is perpendicular to and away from the ABS. Accordingly, the demagnetization field is counterbalanced by the sense current and ferromagnetic coupling fields. It is desirable to maintain a proper balance of these fields so that the magnetic moment 226 of the free layer is oriented parallel to the ABS which is the proper orientation when the bias point is at a zero position on the transfer curve of the sensor.

Exemplary materials and thicknesses for the various layers are 425 Å of nickel oxide (NiO) for the pinning layer 216, 10 Å of nickel iron (NiFe) for the seed layer 214, 24 Å of cobalt (Co) for the first AP pinned layer 210, 8 Å of ruthenium (Ru) for the AP coupling layer 208, 24 Å of cobalt (Co) for the second AP pinned layer 212, 24 Å of copper (Cu) for the spacer layer 202, 70 Å of nickel iron (NiFe) for the free layer 206 and 50 Å of tantalum (Ta) for the cap layer 224.

The magnetoresistive coefficient (dr/R) of the sensor 200 in FIG. 12 was 3.95% and the ferromagnetic coupling field ($H_F$) was 8–9 oersteds. It is a purpose of the present invention to increase the magnetoresistive coefficient (dr/R) of this type of spin valve sensor without substantially changing the ferromagnetic coupling field ($H_F$).

EXAMPLE 2

Figure 13:
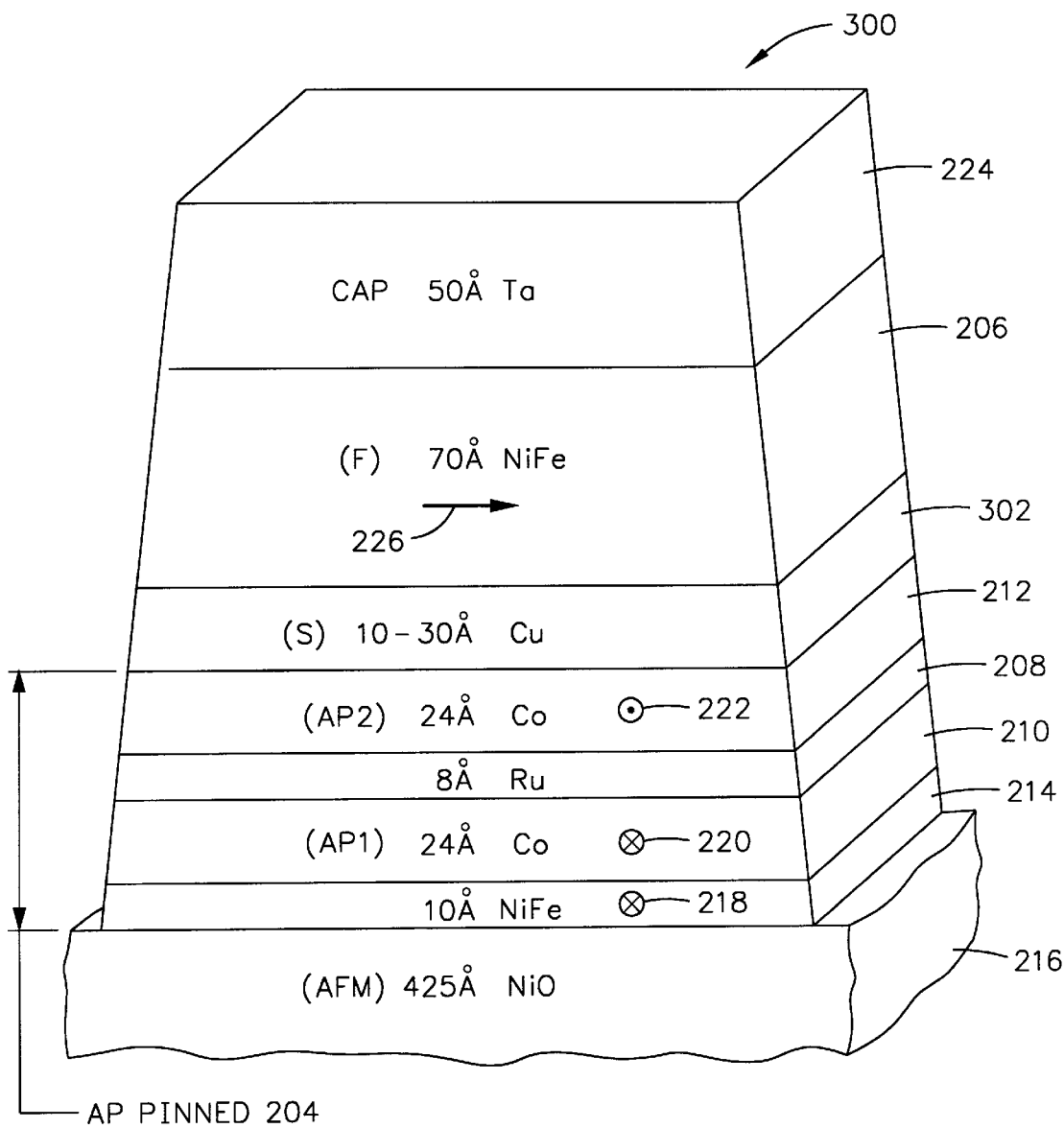
FIG. 13 is a second example which is the same as FIG. 12 except the thickness of the spacer layer has been reduced.

Example 2 of a spin valve sensor 300 is shown in FIG. 13. The spin valve sensor 300 in FIG. 13 is the same as the spin valve sensor 200 in FIG. 12 except for a spacer layer 302 which is 22.5 Å of copper (Cu) instead of 24 Å of copper (Cu). A reduction in the thickness of the spacer layer increases the magnetoresistive coefficient (dr/R) and increases the ferromagnetic coupling field ($H_F$) between the second AP pinned layer 212 and the free layer 206.

The magnetoresistive coefficient (dr/R) of the spin valve sensor 300 is 4.2% which is an increase greater than 6% over the magnetoresistive coefficient (dr/R) of the spin valve sensor shown in FIG. 12. While this is a desirable increase in the magnetoresistive coefficient (dr/R) the ferromagnetic coupling field ($H_F$) has been increased from 8–9 Oe for the spin valve sensor 200 in FIG. 12 to 20 Oe.

The present invention, which is described below, increases the magnetoresistive coefficient (dr/R) without increasing the ferromagnetic coupling field ($H_F$) or maintains the magnetoresistive coefficient (dr/R) while decreasing the ferromagnetic coupling field ($H_F$). Further, the present invention may increase the magnetoresistive coefficient (dr/R) by a reduced amount while decreasing the ferromagnetic coupling field ($H_F$) by a reduced amount, as desired.

EXAMPLE 3

First Embodiment of the Invention

Figure 14:
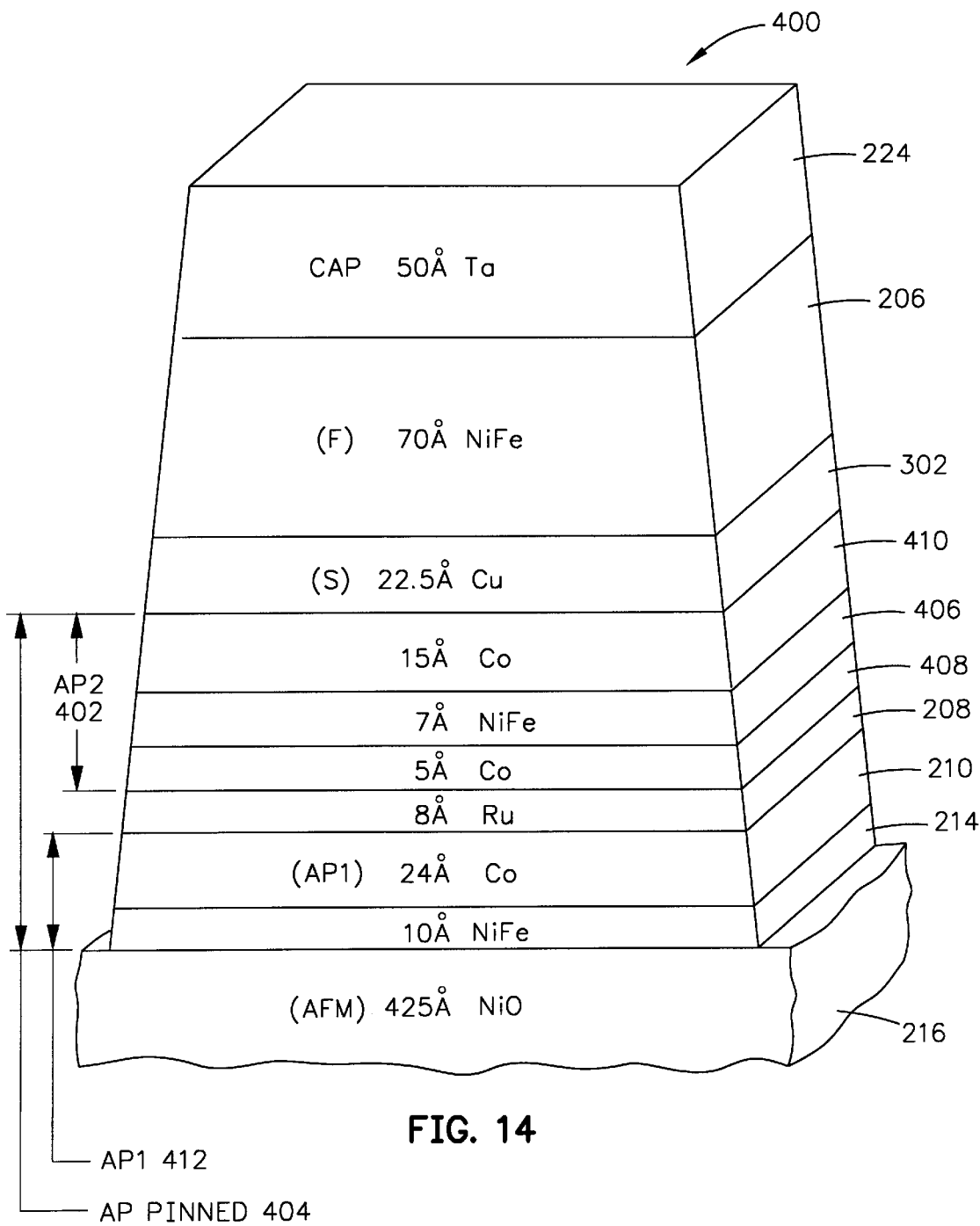
FIG. 14 is a third example and first embodiment of the invention, which is the same as FIG. 13, except the novel trilayer pinned layer structure has been substituted for a second AP pinned layer of an AP pinned layer structure.

FIG. 14 shows a third example 400 which is a first embodiment of the present spin valve sensor. The spin valve sensor 400 in FIG. 14 is the same as the spin valve sensor 300 in FIG. 13 except the second AP pinned layer 402 of the AP pinned structure 404 incorporates a novel multifilm structure instead of the single cobalt (Co) layer 212 shown in FIG. 12. The second AP pinned layer 402 includes a nickel iron (NiFe) middle film 406 which is located between cobalt (Co) first and second films 408 and 410. In a preferred embodiment the second cobalt (Co) film 410 is thicker than the first cobalt (Co) film 408 and interfaces the spacer layer 302. The thinner cobalt (Co) first layer 408 interfaces the AP coupling layer 208. The first AP pinned layer 408 is 5 Å of cobalt (Co), the middle layer 406 was 7 Å of nickel iron (NiFe) and the second layer is 15 Å of cobalt (Co). The thicknesses of the other layers of the spin valve sensor 400 in FIG. 14 are the same as the thicknesses of the spin valve sensor 300 in FIG. 13 including the reduced thickness of the spacer layer 302. The magnetic thickness of a multifilm second AP pinned layer 402 of the spin valve sensor 400 is substantially equivalent to the magnetic thickness of the single film of cobalt (Co) 212 of the spin valve sensor 300.

The multifilm structure of the second AP pinned layer 402 decreased the ferromagnetic coupling field ($H_F$) from 20 Oe of the spin valve sensor 300 in FIG. 13 to 7.8 Oe. Accordingly, the magnetic coupling field ($H_F$) of the sensor 400 in FIG. 14 is equivalent to the ferromagnetic coupling field ($H_F$) of the spin valve sensor 200 in FIG. 12, but has an increased magnetoresistive coefficient (dr/R) from 3.95% to 4.2%. Since the layers 408, 406 and 410 are sequentially formed the cobalt (Co) layer 408 can be considered as a seed layer for the nickel iron (NiFe) layer 406 which, in turn, is a seed layer for the second cobalt (Co) layer 410. It is believed that the multifilm structure of the second AP pinned layer 402 increases the smoothness of the surfaces of these layers and thereby decreases the ferromagnetic coupling field ($H_F$). An increase in smoothness of the surfaces of these layers decreases the ferromagnetic coupling field between the second AP pinned layer 402 and the free layer 206. The thicknesses of the films of this example were 5 Å of cobalt (Co) for the first layer 408, 7 Å of nickel iron (NiFe) for the middle layer 406 and 15 Å of cobalt (Co) for the second layer 410. In the preferred embodiment the thicker second layer 410 interfaces the spacer layer 302 and the thinner first layer 408 interfaces the AP coupling layer 208.

EXAMPLE 4

Second Embodiment of the Present Invention

Figure 15:
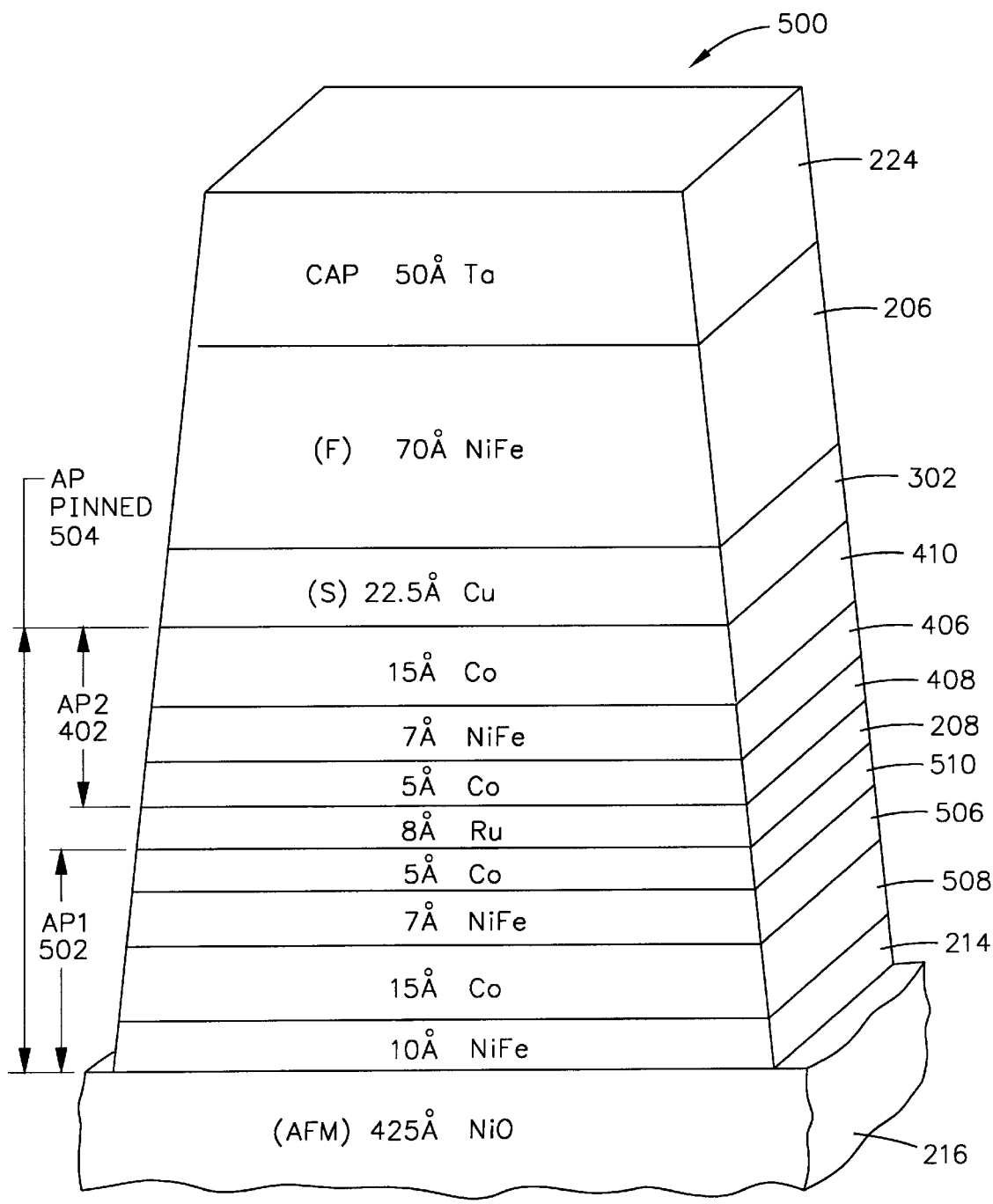
FIG. 15 is a fourth example and second embodiment of the invention wherein the novel trilayer pinned layer structure is substituted for both of the AP pinned layers of the AP pinned layer structure.

FIG. 15 illustrates a spin valve sensor 500 (second example of the invention) which is the same as the spin valve sensor 400 in FIG. 14 except the first AP pinned layer 502 of the AP pinned layer structure 504 also incorporates the novel multifilm structure of the present invention. The single cobalt (Co) layer 210 of the embodiment 400 in FIG. 14 has been replaced in the first AP pinned layer 502 in FIG. 15 by a nickel iron (NiFe) middle layer 506 which is located between a cobalt (Co) first film 508 and a cobalt (Co) second film 510. The first film 508 was 15 Å of cobalt (Co), the middle film 506 was 7 Å of nickel iron (NiFe) and the second film 510 was 5 Å of cobalt (Co). Accordingly, the thinner cobalt (Co) film interfaces the AP coupling layer 208 and the first cobalt (Co) film 508 interfaces the nickel iron (NiFe) seed layer 214.

EXAMPLE 5

Third Embodiment of the Invention

Figure 16:
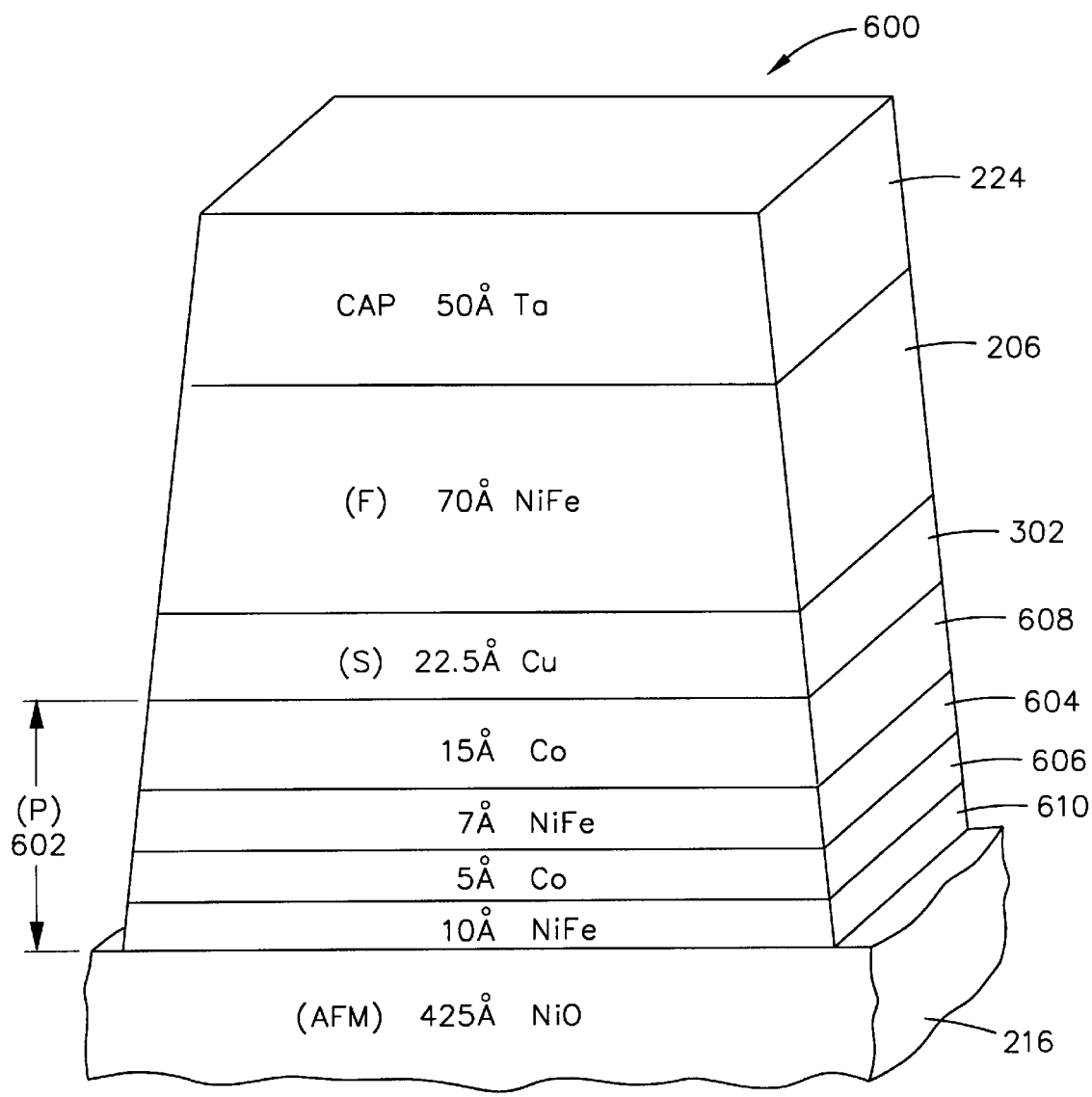
FIG. 16 is an ABS isometric illustration of a fifth example and third embodiment of the present invention wherein a novel trilayer pinned layer structure is substituted for a single pinned layer structure.

FIG. 16 shows a fifth example 600 of a spin valve sensor which is a third embodiment of the present invention. The spin valve sensor 600 in FIG. 16 is the same as the spin valve sensor 400 in FIG. 14 except the AP pinned layer structure 404 has been replaced by a single pinned layer structure 602. The pinned valve structure 602 includes a nickel iron (NiFe) middle film 604 which is located between a cobalt (Co) first film 606 and a cobalt (Co) second film 608. The first film 606 is 10 Å of cobalt (Co), the middle film 604 is 7 Å of nickel iron (NiFe) and the second film 608 is 15 Å of cobalt. The pinned structure 602 further includes a 10 Å nickel iron (NiFe) seed layer 610 between the pinning layer 216 and the first cobalt (Co) layer 606. Accordingly, the thicker cobalt (Co) film 608 interfaces the spacer layer 302 and the thinner cobalt (Co) layer 606 interfaces the seed layer 610. With a reduced thickness of the spacer layer 302 from 24 Å to 22.5 Å the magnetoresistive coefficient (dr/R) increased while the ferromagnetic coupling field ($H_F$) maintained substantially constant.

Discussion

It should be understood that the cobalt (Co) and nickel iron (NiFe) layers can be alloys with a cobalt (Co) base or nickel (Ni) base, if desired. For instance, the cobalt (Co) layers may be replaced with cobalt iron (CoFe). The nickel based materials may be nickel iron chromium (NiFeCr), nickel iron hafnium (NiFeHf), nickel cobalt (NiCo) or nickel chromium (NiCr). Further, the thicknesses of the various layers may be altered as desired. A change in the thickness of the spacer layer will result in a change in the magnetoresistive coefficient (dr/R) of the sensor while a change in the thicknesses of the films of the pinned layer structure will result in a change in the ferromagnetic coupling field ($H_F$). In preferred embodiments the thicker of the two cobalt films of the second AP pinned layer interfaces the spacer layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor that includes:
      a ferromagnetic pinned layer structure that has a magnetic moment;
      an antiferromagnetic pinning layer exchange coupled to the pinned layer structure for pinning the magnetic moment of the pinned layer structure;
      a ferromagnetic free layer having a magnetic moment that is free to rotate in response to signal fields;
      a nonmagnetic conductive spacer layer located between the pinned layer structure and the free layer;
   the pinned layer structure including:
      cobalt (Co) based first and second films and a nickel (Ni) based middle film; and
      the middle film being located between the first and second films.

2. A magnetic read head as claimed in claim 1 including:
   the spin valve sensor having first and second side edges;
   first and second hard bias and lead layers connected to the first and second side edges of the spin valve sensor;
   nonmagnetic nonconductive first and second read gap layers;
   the spin valve sensor and the first and second hard bias and lead layers being located between the first and second read gap layers;
   ferromagnetic first and second shield layers; and
   the first and second read gap layers being located between the first and second shield layers.

3. A magnetic read head as claimed in claim 2 wherein the pinned layer structure includes:
   ferromagnetic first and second antiparallel (AP) pinned layers;

an antiparallel (AP) coupling layer located between the first and second AP pinned layers; and one of the first and second AP pinned layers including said first, second and middle films.

4. A magnetic read head as claimed in claim 3 including:

the second AP pinned layer being located between the first AP pinned layer and the spacer layer and including said first, second and middle films; and the first AP pinned layer being exchange coupled to said pinning layer.

5. A magnetic read head as claimed in claim 4 wherein the first AP pinned layer includes a cobalt (Co) based film and a nickel (Ni) based film with the nickel (Ni) based film being exchange coupled to the pinning layer and the cobalt (Co) based film interfacing the AP coupling layer.

6. A magnetic read head as claimed in claim 5 wherein the pinning layer is nickel oxide (NiO).

7. A magnetic read head as claimed in claim 6 wherein:

the second film is thicker than the first film and interfaces the spacer layer; and the cobalt (Co) based layers and films are cobalt (Co) and the nickel (Ni) based layers and films are nickel iron (NiFe).

8. A magnetic read head as claimed in claim 4 wherein the first AP pinned layer includes:

cobalt based third and fourth films and a nickel based second middle film;

the second middle film being located between the third and fourth films; and a nickel based seed layer exchange coupled to and located between the pinning layer and the third film.

9. A magnetic read head as claimed in claim 8 wherein:

the pinning layer is nickel oxide (NiO);

the second film is thicker than the first film and interfaces the spacer layer; and the cobalt (Co) based films are cobalt (Co) and the nickel (Ni) based seed layers and films are nickel iron (NiFe).

10. A magnetic read head as claimed in claim 2 including:

the pinned layer structure further including a nickel iron (Ni Fe) based seed layer that is exchange coupled to the pinning layer and is located between the pinning layer and the first film; and the second film being thicker than the first film and interfacing the spacer layer.

11. A magnetic read head as claimed in claim 10 wherein: the pinning layer is nickel oxide (NiO).

12. A magnetic head assembly having a read head and a write head comprising:

the write head including:
ferromagnetic first and second pole piece layers;
each of the first and second pole piece layers having a yoke portion located between a pole tip portion and a back gap portion;
nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
a spin valve sensor that has first and second side edges;
nonmagnetic nonconductive first and second read gap layers;
first and second hard bias and lead layers connected to the first and second side edges of the spin valve sensor;
a ferromagnetic first shield layer; and
the first and second read gap layers being located between the first shield layer and the first pole piece layer; and the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment that is free to rotate in response to signal fields; and
a nonmagnetic conductive spacer layer located between the pinned layer structure and the free layer; and the pinned layer structure including:
cobalt (Co) based first and second films and a nickel iron based middle film; and
the middle film being located between the first and second films.

13. A magnetic head assembly as claimed in claim 12 including:

the read head further including:
a ferromagnetic second shield layer;
a nonmagnetic separation layer; and
the separation layer being located between the second shield layer the first pole piece layer.

14. A magnetic head assembly as claimed in claim 12 wherein the pinned layer structure includes:

ferromagnetic first and second antiparallel (AP) pinned layers;

an antiparallel (AP) coupling layer located between the first and second AP pinned layers; and one of the first and second AP pinned layers including said first, second and middle films.

15. A magnetic head assembly as claimed in claim 14 including:

the second AP pinned layer being located between the first AP pinned layer and the spacer layer and including said first, second and middle films; and the first AP pinned layer being exchange coupled to said pinning layer.

16. A magnetic head assembly as claimed in claim 15 wherein the first AP pinned layer includes a cobalt (Co) based film and a nickel iron (NiFe) based film with the nickel iron (NiFe) based film being exchange coupled to the pinning layer and the cobalt (Co) based film interfacing the AP coupling layer.

17. A magnetic head assembly as claimed in claim 16 wherein:

the pinning layer is nickel oxide (NiO); and the second film is thicker than the first film and interfaces the spacer layer.

18. A magnetic head assembly as claimed in claim 15 wherein the first AP pinned layer includes:

cobalt based third and fourth films and a nickel iron based second middle film;

the second middle film being located between the third and fourth films; and a nickel iron based seed layer exchange coupled to and located between the pinning layer and the third film.

19. A magnetic head assembly as claimed in claim 12 including:

the pinned layer structure further including a nickel iron (Ni Fe) based seed layer that is exchange coupled to the pinning layer and is located between the pinning layer and the first film; and the second film being thicker than the first film and interfacing the spacer layer.

20. A magnetic disk drive having at least one slider that has an air bearing surface (ABS), the slider supporting at least one magnetic head assembly that includes a read head and a write head, the disk drive comprising:

the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
a spin valve sensor that has first and second side edges;
first and second hard bias and lead layers connected to the first and second side edges of the spin valve sensor;
nonmagnetic nonconductive first and second read gap layers;
the spin valve sensor and the first and second hard bias and lead layers being located between the first and second read gap layers;
a ferromagnetic first shield layer; and
the first and second read gap layers being located between the first shield layer and the first pole piece layer; and the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment that is free to rotate in response to signal fields; and
a nonmagnetic conductive spacer layer located between the pinned layer structure and the free layer; and the pinned layer structure including:
cobalt (Co) based first and second films and a nickel iron (NiFe) based middle film; and
the middle film being located between the first and second films; and a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

21. A magnetic disk drive as claimed in claim 20 including:
the read head further including:
a ferromagnetic second shield layer;
a nonmagnetic separation layer; and
the separation layer being located between the second shield layer the first pole piece layer.

22. A magnetic disk drive as claimed in claim 20 wherein the pinned layer structure includes:
ferromagnetic first and second antiparallel (AP) pinned layers;
an antiparallel (AP) coupling layer located between the first and second AP pinned layers; and
one of the first and second AP pinned layers including said first, second and middle films.

23. A magnetic disk drive as claimed in claim 22 including:
the second AP pinned layer being located between the first AP pinned layer and the spacer layer and including said first, second and middle films; and
the first AP pinned layer being exchange coupled to said pinning layer.

24. A magnetic disk drive as claimed in claim 23 wherein the first AP pinned layer includes a cobalt (Co) based film and a nickel (Ni) based film with the nickel (Ni) based film being exchange coupled to the pinning layer and the cobalt (Co) based film interfacing the AP coupling layer.

25. A magnetic disk drive as claimed in claim 24 wherein:
the pinning layer is nickel oxide (NiO); and
the second film is thicker than the first film and interfaces the spacer layer.

26. A magnetic disk drive as claimed in claim 23 wherein the first AP pinned layer includes:
cobalt based third and fourth films and a nickel iron (NiFe) based second middle film;
the second middle film being located between the third and fourth films; and
a nickel iron based seed layer exchange coupled to and located between the pinning layer and the third film.

27. A magnetic disk drive as claimed in claim 20 including:
the pinned layer structure further including a nickel iron (Ni Fe) based seed layer that is exchange coupled to the pinning layer and is located between the pinning layer and the first film; and
the second film being thicker than the first film and interfacing the spacer layer.

* * * * *